United States Patent
Kember

[15] 3,692,256
[45] Sept. 19, 1972

[54] TAPE POSITIONING APPRATUS

[72] Inventor: Bryan F. Kember, Palo Alto, Calif.

[73] Assignee: Ampex Corporation, Redwood City, Calif.

[22] Filed: April 1, 1970

[21] Appl. No.: 24,763

[52] U.S. Cl. ....................242/198, 242/68.4

[51] Int. Cl. ......G03b 1/04, G11b 15/32, G11b 23/04

[58] Field of Search ..............242/182–185, 197–200, 242/74, 74.1, 68.3, 71.8 A, 68.4, 116

[56] References Cited

UNITED STATES PATENTS

| | | | |
|---|---|---|---|
| 2,476,928 | 7/1949 | Thomas | 242/71.8 A |
| 2,881,985 | 4/1959 | Overmire et al. | 242/71.8 A |
| 3,041,005 | 6/1962 | Wallace | 242/116 |
| 2,941,741 | 6/1960 | Bilsback | 242/199 |
| 2,801,811 | 8/1957 | Dale | 242/74.1 |
| 3,195,828 | 7/1965 | Kuckhoff et al. | 242/74.1 |
| 3,525,480 | 8/1970 | Willard | 242/183 |

*Primary Examiner*—Leonard D. Christian
*Attorney*—Robert G. Clay

[57] ABSTRACT

A magnetic tape cassette, particularly for television, is arranged to be positioned against a precision wall of a tape transport for exposing a run of tape between the tape packs of the cassette in the precision place for acceptance by the transport. The hubs are formed with springloaded portions engageable with the cassette side walls for braking the hubs to avoid spilling the tape when the cassette is separated from the transport, and the hubs are adapted to be engaged by extension means from the transport for centering and driving the hubs and for releasing the brakes to allow free operative rotation of the hubs. The hub is constructed with the operative portions in two separable parts which support a tape mounting sleeve which is removable with the tape, saving the expense of providing more than two operative hub portions for each cassette. The tape is attached to the sleeve by means of a dovetail slot and toed clip member. An arrangement adapting the apparatus for positioning the run of tape when it is mounted on ordinary reels is also disclosed.

11 Claims, 3 Drawing Figures

PATENTED SEP 19 1972

3,692,256

SHEET 1 OF 2

INVENTOR
BRYAN F. KEMBER

BY Robert H. Clay

ATTORNEY

INVENTOR.
BRYAN F. KEMBER
BY
Robert G. Clay
ATTORNEY

TAPE POSITIONING APPRATUS

BACKGROUND OF THE INVENTION

The present invention relates to magnetic tape transports, and particularly to means for positioning a run of tape in operative relation to the transport.

In co-pending U.S. patent application Ser. No. 24,760, entitled "Cassette Feeding Apparatus" filed Apr. 1, 1970, by Alfred F. Stahler, there is disclosed a tape positioning arrangement for a magnetic tape transport of the type further disclosed in co-pending patent application Ser. No. 809,759, entitled "Automatically Threading Tape Transport" filed Mar. 24, 1969, by Alfred F. Stahler.

In the first-named of these applications, an arrangement is shown for feeding cassettes to the transport, and the present invention relates particularly to details of the cassette construction, including a brake for the tape pack hubs thereof that engages when the cassette is separated from the transport to prevent tape spillage and disengages automatically when the cassette is inserted in the transport to free the tape packs for processing; also structure by which the hubs are adapted for precise positioning in the transport and for being driven in operation therein, means for attaching the tape ends to the hubs, and alternative means for positioning a run of tape mounted on reels instead of a cassette.

Accordingly, it is an object of the present invention to provide an improved magnetic tape cassette.

It is another object to provide a cassette adapted to prevent spillage of tape.

It is a further object to provide a cassette adapted for precise positioning of the tape packs in relation to a transport and independently of the cassette housing.

It is a still further object to provide a cassette having improved tape attachment to the hubs thereof.

It is yet another object to provide tape positioning means usable with reel-to-reel structure in a cassette handling transport.

DETAILED DESCRIPTION

Figure 3:
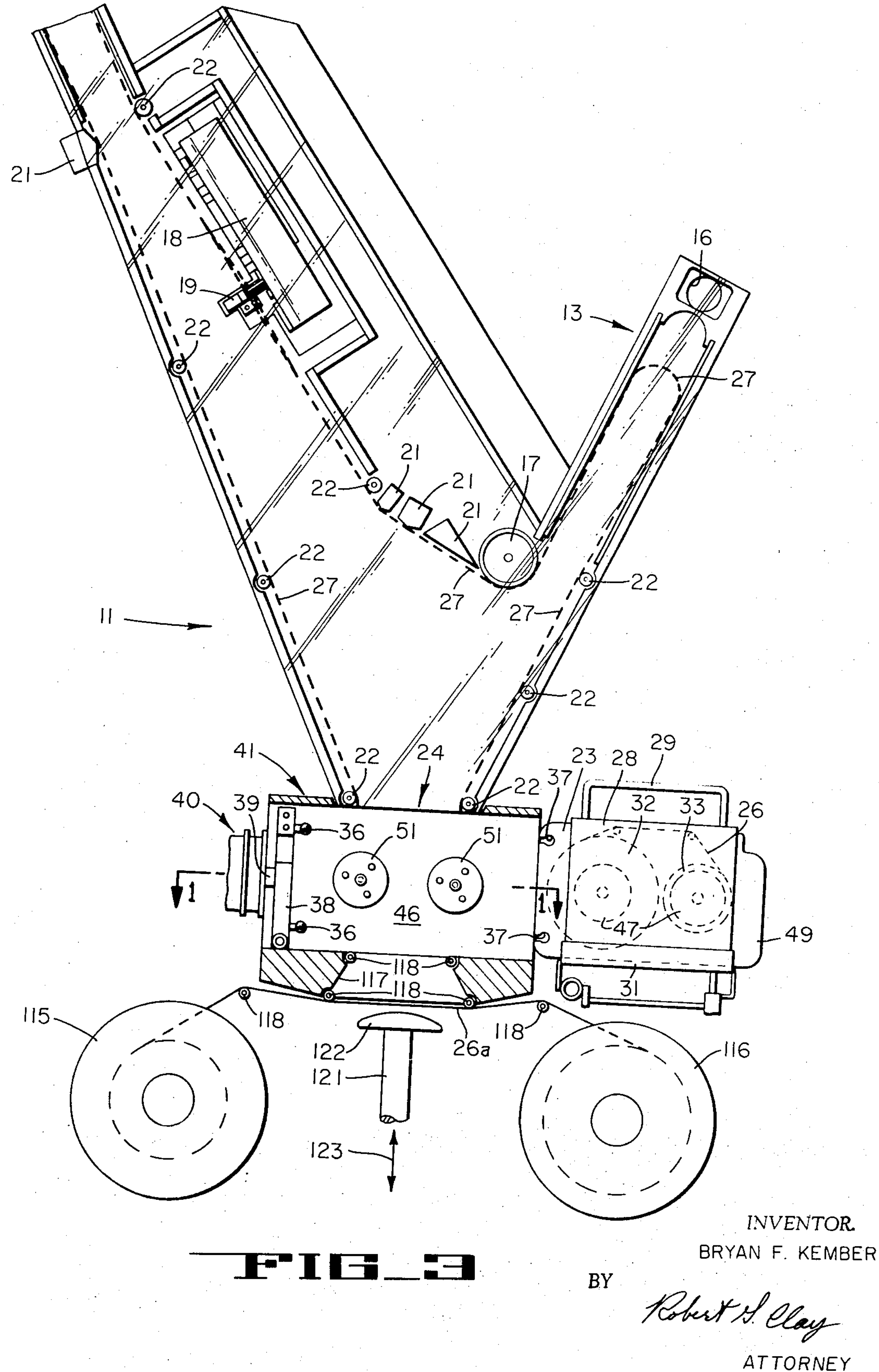
FIG. 3 is a broken-away elevation view, to a reduced scale, of apparatus including the structure of FIGS. 1 and 2.

FIG. 3 shows a magnetic tape transport 11 similar to the one disclosed in co-pending U.S. Pat. application Ser. No. 809,759, previously mentioned. In this transport, there are provided a pair of vacuum type tape loop storage columns 12, 13 having vacuum ports 15, 16, respectively, that communicate with a vacuum source, not shown. Also provided is a vacuum capstan 17, a rotary television head assembly 18 with a retractable female guide 19, and various longitudinal heads 21 and air bearing guides 22. In operation, a cassette 23 is positioned at the opening 24 of the transport, and a loop of tape 26 is drawn into the transport by the action of the vacuum, and assumes an operating path illustrated by the dashed line 27.

To automatically feed an array of cassettes one-by-one and selectively to the transport, there is provided a magazine assembly 28 (FIGS. 1–3), having handles 29 to facilitate hand loading and unloading of the magazine on a sliding tray 31. Mechanism, not shown, may be provided to move the tray and magazine in a direction parallel to the axes of the cassette tape packs 32, 33.

Arriving at the plane of the transport 11, the selected cassette is engaged by two pairs of key elements 36 which fit into a pair of keyway grooves 37 in the cassette, and are mounted on a plate 38 on the end of a reciprocating rod 39 forming the armature of a linear motor 40 for automatic insertion and withdrawal of the cassette into and from a cassette holding means 41 attached to the transport.

For clarity's sake, the rod 39 with keys 36 is shown in the position it would occupy while holding a cassette in the holding means 41, but with no cassette therein. It will be understood, however, that normally with the rod in this position there will be a cassette in the holding means, and that if there is no cassette in the holding means, the rod will be fully extended so that movement of the magazine 26 in the direction of arrow 34 causes each cassette in turn to momentarily engage the keys 36 with its keyways 37, and when the magazine is stopped with the next selected cassette in the plane of the transport, the newly selected cassette is already engaged with the insertion keys 36 and is ready for insertion in the holding means 41. One exception to this arrangement will be described below in relation to reels 115, 116.

The provision of four keys 36 assures the substantially correct alignment of the cassette in the plane of the transport, as well as substantially correct positioning with respect to X, Y axes in the transport plane. However, for more precise positioning of the tape packs as is required for proper operation of the transport, the following additional measures are taken. First the cassette is urged by means 45 against a precision positioning wall 46; second, the tape pack hubs 47 are arranged to be only loosely journalled in the side walls 48, 49 of the cassette in their operative position, and can therefore be positioned and aligned with extreme precision independently of dimensional or positional inaccuracy in the cassette; and third, extension means 51, 52 are provided to engage the hubs to effect the precision positioning desired. As will be seen, the means 51, 52 also perform the functions of driving the hubs in operational rotation, and of releasing an automatic braking arrangement that is built into the hubs to lock them against rotation and the spilling of tape when the cassette is removed from the transport.

Figure 1:
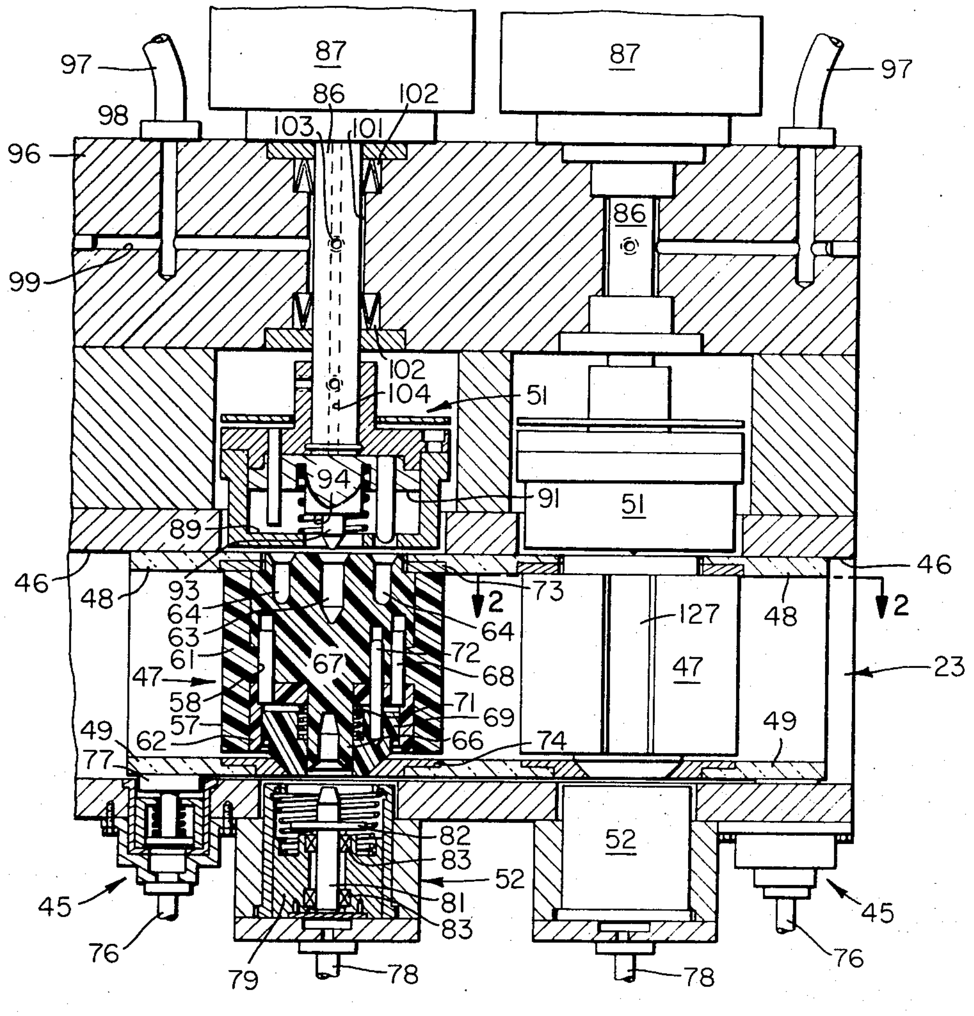
FIG. 1 is a plan section view of a magnetic tape cassette and handling means therefor in accordance with the invention, the view with relation to the handling means being taken on the plane of lines 1—1 of FIG. 3.

As shown more clearly in FIG. 1, the hub 47 is formed with an outer disposable sleeve 57, which supports the tape pack, and which may be removed with the tape pack when it is desired to change tapes, so as to save the expense of providing more than two of the more complex assemblies (described below) per cassette. The sleeve 57 has an interior centered flange 58, which fits against shoulders formed on a pair of interfitting hub assembly elements 61 and 62. The element 61 has a centering bore 63 and a plurality of driving keyway bores 64 arranged in a circle thereabout, and also an axial shaft 66 extending in the other direction and containing a centering bore 67. The element 62 is formed as a cup-shaped member and has a central opening which fits slidingly on the shaft 66. The two elements 61, 62 are held together by fastening elements 68, but may be pulled apart to release and dismount the sleeve 57 and associated tape pack.

The hub brake previously mentioned is provided by means of a brake element 69 fitting within the cupped portion of element 62 and sliding on the shaft 66, urged in an outward axial direction by a helical compression spring 71. The brake element 69 is retained against rotation with respect to the hub by means of a key pin 72 that fits slidingly in conforming bores in hub elements 61 and 62. The spring 71 urges the elements 69 and 61 apart and causes element 61 together with the associated end of sleeve 57 to brakingly engage a frictional inset 73 in the wall 48 of the cassette, while element 69 frictionally engages an inset 74 in the wall 49 of the cassette. Element 69 and inset 74 have mating conical faces defining a combination thrust and journal bearing. However, it will be seen that pushing the elements 69 and 61 together so as to further compress the spring 71 has the double effect of releasing the braking engagement of both ends of the hub and of causing both hub ends to be only loosely journalled in the cassette so as to be all the more freely precision positioned by the extension means 51, 52.

Each means 45 has a compressed air conduit 76 by which air under pressure is admitted to operate a springloaded piston 77 for pushing the cassette against the precision positioning wall 46.

Each means 52 is similarly provided with a conduit 78 by which air under pressure is admitted to operate a spring-loaded piston 79. A centering pin 81 and flange 82 is centrally mounted in the piston 79 as by means of a pair of ball bearing races 83, which permit rotation of the pin and flange as the hub 47 of the cassette is rotated during operation. When the piston 79 is operated, the tip of pin 81 enters the bore 67 for centering the hub, while the flange 82 pushes against the end of brake element 69 and backs it away from inset 74 so as to release the brake.

Each element 51 is mounted on a drive shaft 86 driven by a motor 87. The element 51 includes a disc 88 and a hollow cup-shaped element 89 mounted thereon to form a housing for an axially slidable springloaded piston 91, which is keyed for rotation with the disc 88 and drive shaft as by means of a pin 92 extending from the disc 88 and through the piston 91. The piston 91 also has a keying pin extending therefrom and through the housing element 89 to enter any of the keyway bores 64 when the piston is operated; and the piston also has a central centering pin 93 and flange 94 which extend through a suitable opening in housing element 89 to enter the centering bore 63 and push the hub element 61 away from frictional contact with inset 73 to release the brake at this end of the hub also. To operate the piston 91, the journalling member 96 is provided with conduits 97 and bores 89, 99 by which compressed air is admitted to a manifold bore 101 surrounding the shaft 86 and sealed by seals 102. The shaft 86 has a radial passage 103 communicating from the manifold 101 and with an axial bore 104 in the shaft. The bore 104 opens on the back side of the piston 91 and admits the compressed air to operate the piston.

The manner in which the tape is drawn into the transport is more fully described in the previously mentioned co-pending application, Ser. No. 809,759. It will be understood however that a condition for successful threading is that the tape in the run between the tape packs of the cassette must be positioned in substantial (though not necessarily perfect) vacuum sealing relation across the mouth 24 of the transport tape inlet. It follows therefore, that if it is desired to adapt the transport with cassette feeding mechanism to reel-to-reel operation, as illustrated in FIG. 3, some special arrangements must be made in view of the fact that the cassette holding means 41 magazine 28 and tray 31 are awkwardly in the way of the run of tape 26*a* between the reels 115 and 116, and of the reel 116 itself. As shown in the Figure, this problem is overcome by providing the holding means 41 with a bottom opening 117, across which the tape run 26a is stretched as by means of air lubricated guides 118. In order to bring the exposed tape run to the mouth 24 of the transport, the magazine 28 is operated to bring a blank space, containing no cassette, to the plane of the transport, the keys 36 are withdrawn to the position shown, and the reel mounted tape is then pushed up to the mouth 24 by means of a piston 121 having a suitably shaped head 122 and operating in the direction shown by the arrows 123.

Figure 2:
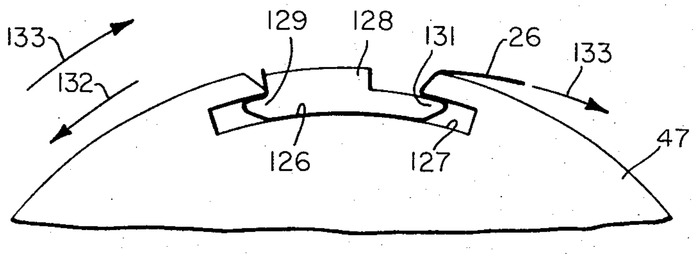
FIG. 2 is an enlarged elevation view, taken on the plane of lines 2—2 of FIG. 1 of a portion of the apparatus.

To make a secure attachment of the tape ends 126 to the hubs 47 of the cassette, as shown in FIG. 2, the hubs are each provided with a dovetail recess 127 (see also FIG. 1) formed in an axial direction across the tape engaging portion of the hub, and a tape clip element 128 is provided with toes 129, 131 engaging the sides of the recess when theclip is urged in circumferential direction 132 as by the pull of the tape in the opposite direction 133, so as to lock in place in the recess. However, when the clip 128 is directly urged in the opposite direction 133, only the one toe 131 can remain engaged and the clip and tape are freed for detachment from the hub. As shown here, the recess 127 may be formed generally to a T-shape, and the clip also, with toe or arm 129 being substantially shorter than the toe or arm 131.

What is claimed is

1. Apparatus for positioning and preparing a run of magnetic tape for processing in a magnetic tape transport, comprising;

a cassette including a pair of hubs with a magnetic tape wound thereon and stretched therebetween to define a first run of said tape;

means for positioning said cassette with said first run of tape exposed to said transport for processing; and means for engaging the ends of said hubs for holding said hubs in predetermined positions out of frictional contact with said cassette when said cassette is in said positioning means;

each of said hubs having a truncated brake cone element mounted for axial movement in one end of said hub with said cone engaging a conforming truncated conical opening in a side wall of said cassette;

said brake cone element being spring-loaded to tend to separate from said hub so that said cone element is urged against said conical opening while the other end of said hub is concurrently urged against the other side wall of said cassette when said hub end engaging means are withdrawn.

2. Apparatus as described in claim 1, wherein:

said brake cone element has a central bore fitting upon a shaft element extending integrally from said hub in an axial direction and having axially formed therein a first centering bore; and said hub engaging means includes a first pin and flange assembly extending to cause said first pin to enter said first centering bore and said first flange to push said shaft element and conical brake element axially inwardly to disengage said brake element from the adjacent wall of said cassette.

3. Apparatus as described in claim 2, wherein:

said other end of said hub has a second centering bore formed axially therein and a plurality of keying bores arranged in a circle thereabout; and said hub engaging means includes a second centering pin and flange assembly that in turn also includes a key pin, said second assembly extending to cause said second centering pin to enter said second centering bore and said second flange to push said hub axially inwardly to disengage said hub from the adjacent wall of said cassette, while said key pin enters one of said keying bores to enable driving of said hub.

4. Apparatus as described in claim 3, wherein said hub is formed in three parts, including:

a first part including said second centering and keying bores and having said shaft element extending integrally therefrom;

a second cup-shaped part having a central opening fitting upon said shaft element and a cylindrical outer wall defining a hollow recess into which snugly but slidingly fits said brake cone element;

said brake cone element having a keying pin extending therefrom and slidingly through said second part and into a key bore formed in said first part;

a third part of generally cylindrical shape fitting snugly around said first and second parts and defining a disposable winding element for said tape;

said third part having an interior flange fitting between a pair of shoulders formed on said first and second parts respectively.

5. Apparatus as described in claim 4, wherein said third part has:

a dovetail recess formed in an axial direction across the tape engaging portion of said third part; and a tape-end clip element having toes engaging the sides of said dovetail recess when said clip element is urged in one circumferential direction so as to lock in place in said recess, but engaging only one side of said dovetail recess when urged in the other circumferential direction so as to be free for withdrawal and insertion.

6. Apparatus as described in claim 5, wherein:

said dovetail recess is formed with a T cross section; and said clip element is also formed with a T cross section, but having one arm of the T shorter than the other.

7. Apparatus as described in claim 1, wherein:

said tape transport is of the type including tape transducing and metering means, and differential air pressure means for drawing a loop of tape from said first run of said cassette in said positioning means and into transducing and metering relationship with said transducing and metering means;

said transport also has a pair of tape reels with tape mounted thereon and stretched in a second run therebetween for reel-to-reel operation, said reels being positioned to expose said second run of tape to said differential air pressure means through a suitable opening in the side of said positioning means opposite to said differential air pressure means when said cassette is absent from said positioning means; and a piston arranged to push said second run of tape through said cassette positioning means to bring said second run into processing relationship with said differential air pressure means.

9. As a subcombination, a hub for winding magnetic tape, comprising;

a cylindrical tape supporting element having a dovetail recess formed in an axial direction across the tape engaging portion thereof; and a tape-end clip element having toes engaging the sides of said dovetail recess when said clip element is urged in one circumferential direction so as to lock in place in said recess, but engaging only one side of said dovetail recess when urged in the other circumferential direction so as to be free for withdrawal and insertion.

10. The subcombination recited in claim 9, wherein:

said dovetail recess is formed with a T cross section; and said clip element is also formed with a T cross section, but having one arm of the T shorter than the other.

11. As a subcombination, an apparatus for positioning and preparing a run of magnetic tape for processing in a magnetic tape transport of the type including cassette positioning means, tape transducing and metering means, and differential air pressure means for drawing a loop of tape from said cassette in said positioning means and into transducing and metering relationship with said transducing and metering means, comprising:

a pair of tape reels with tape mounted thereon and stretched in a run therebetween for reel-to-reel operation, said reels being positioned to expose said reel-mounted run of tape to said differential air pressure means through a suitable opening in the side of said positioning means opposite to said differential air pressure means when said cassette is absent from said positioning means; and a piston arranged to push said reel-mounted run of tape through said cassette positioning means to bring said run into processing relationship with said differential air pressure means.

* * * * *